United States Patent Office 3,306,877
Patented Feb. 28, 1967

3,306,877
PROCESS FOR THE MANUFACTURE OF COPOLYACETALS
Claus Schott, Hofheim, Taunus, Edgar Fischer and Günther Roos, Frankfurt am Main, and Gerhard Bier, Troisdorf, near Cologne, Germany, assignors to Farbwerke Hoechst Aktiengesellschaft vormals Meister Lucius & Bruning, Frankfurt am Main, Germany, a corporation of Germany
No Drawing. Filed June 24, 1963, Ser. No. 290,193
Claims priority, application Germany, June 28, 1962, F 37,179
9 Claims. (Cl. 260—67)

The present invention relates to a process for the manufacture of copolyacetals.

Polyoxymethylenes which are useful as plastics are either obtained by anionic polymerization of formaldehyde or by cationic polymerization of trioxane, which is the cyclic trimer of formaldeheyde, whereby polymers of high molecular weight are obtained. The homopolymer of formaldehyde or trioxane constitutes a polyacetal having unstable terminal semi-formal groups. It is thermally degraded except for a low percentage according to the so-called unzipping reaction with the formation of monomeric formaldehyde. In this reaction a new unstable terminal semi-formal group is formed in the molecule each time a semi-formal molecule is degraded.

In order to convert such polyoxymethylenes having terminal semi-formal groups into industrially useful plastics, it is necessary to stabilize the terminal groups, for example by esterification. For this purpose the polymer can be dissolved, for example in acetic anhydride at 160° C., and converted with the acetic anhydride. After the esterification the surplus acetic anhydride and the acetic acid formed must be removed from the polymer by complicated purification operations. Moreover, the polymers stabilized in this manner are unstable to alkalies on account of the risk of hydrolysis. Furthermore an unzipping reaction again sets in when a molecular chain stabilized by the esterification of the terminal groups is thermally disrupted in the middle of the chain. This also applies in the case of products whose terminal groups have been etherified.

Better results in stabilizing polyoxymethylenes are obtained by copolymerizing trioxane, for example with saturated cyclic ethers or cyclic formals such as, for example, ethylene oxide or diethylene glycol formal.

In order to carry out the stabilization, the unstable terminal groups of the copolymers are degraded by hydrolysis after the polymerization, the unzipping reaction only extending to the comonomer molecules.

When the molecule chain is thermally split in the processing of the polymer, the respective chain can also only be degraded up to the next comonomer molecules, whereby a better thermostability is attained.

In the manufacture of the aforementioned copolymers there are used as catalysts perferably boron fluoride or its derivatives such as etherates, furthermore diazonium fluoborates.

Copolyacetals, especially copolymers with a high content of polyoxymethylene units, a high molecular weight and a high stability are successfully used in the manufacture of injection-molded and extruded articles which may, inter alia, also be used at elevated temperatures.

These polymers consist, in general, of linear, unbranched molecule chains. For many purposes it is desirable to obtain products whose chains are cross-linked with one another so that a three-dimensional molecule combination is obtained.

Now we have found that by copolymerizing trioxane with a bifunctional compound which contains not only an epoxide group but also a cyclic acetal group, three-dimensionally cross-linked polymers are obtained having a high molecular weight and especially valuable properties. Such bifunctional compounds are the dimethylol acetals of a saturated or olefinically unsaturated, possibly halogen-substituted aldehyde containing 1 to 4 carbon atoms in the main valency chain, in which the methylol groups are substituted by an aliphatic hydrocarbon radical containing 2 to 8 carbon atoms and carrying an epoxide group, or by a cycloaliphatic hydrocarbon radical containing 5 to 8 carbon atoms and carrying an epoxide group. Such compounds include, for example, cyclohexene-1,2-oxide-4,4-dioxymethylene-formal, 1,1-dimethylol-propene-oxide-2,3-monochloracetaldehyde acetal or cyclohexene-1,2-oxide-4,4-dioxymethylene acrolein acetal corresponding to the formula

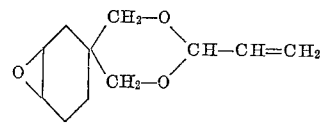

Of the halogen-substituted, saturated or olefinically unsaturated aldehydes, the chlorine-substituted aldehydes are especially suitable.

Three-dimensionally cross-linked polymers obtained in this manner can be processed into especially tough foam plastics with a low specific gravity. Formaldehyde splitting off from the chain ends acts as an expanding agent.

The bifunctional comonomer can be used in various ratios depending on the desired degree of cross-linking. However, 99.9 to 80 percent by weight, calculated on the total monomer mixture, of trioxane is preferably polymerized together with 0.1 to 20 percent by weight of the comonomer, calculated on the total monomer weight. Those polymers made of a monomer mixture consisting of 99.9 to 95 percent by weight of trioxane and 0.1 to 5 percent by weight of the bifunctional comonomer exhibit especially favorable properties.

Polymerization can be carried out according to known methods in bulk, in solution or in suspension, the polymerization in bulk proceeding especially smoothly. The following solvents are preferably used in the solution polymerization: Aliphatic hydrocarbons having 2 to 18 carbon atoms, mononuclear aromatic hydrocarbons which may be mono- or di-substituted by low aliphatic hydrocarbons having 1 to 2 carbon atoms, halogen-, preferably chlorine- or fluorine-substituted aliphatic hydrocarbons containing 1 to 4 carbon atoms, and aliphatic ethers having 2 to 4 carbon atoms.

The polymerization is preferably carried out at temperatures at which trioxane does not crystallize out, that is to say, when a solvent is used, at a temperature within the range of from —50° C. to +100° C. depending on the solvent, or, in the absence of a solvent, at +20° C. to +100° C., preferably at +60° C. to +80° C.

As catalysts there may be used all substances capable of initiating a cationic polymerization application Serial No. 860,739 filed December 21, 1959 in the name of Klaus Weissermel et al. for "Polyacetals and Process for Preparing Them" such as, for example, inorganic and organic acids, acid halides and especially Lewis acids (for a definition of Lewis acids cf. Kortum "Lehrbuch der Elektrochemie," Wiesbaden 1948, pp. 300 to 301). Of the latter, boron fluoride and its complexes, for example borontrifluoride etherates, are especially useful. Diazonium fluoborates and especially aryl diazonium fluoborates may also be used with advantage.

The concentration of the catalysts may vary within wide limits depending on the type of catalyst used and whether copolymers of a high or low molecular weight are to be made. The concentration may range of from 0.0001 to 1 percent by weight, calculated on the mixture of monomers. Generally 0.01 to 1 percent by weight of catalyst is used.

Since the catalyst, especially in the presence of humidity, tends to decompose the polymer, it is recommended that the catalysts be neutralized directly after the termination of the polymerization, for example with ammonia or with methanolic or acetonic solutions of amines of aliphatic hydrocarbons containing 1 to 4 carbon atoms, as well as mono-, di- or triethanol amine.

The unstable semi-acetal terminal groups can, if desired, be removed in the same manner as is the case with other copolymers. The polymer is suitably suspended in aqueous ammonia at temperatures ranging from 100° C. to 200° C., in which case there may also be present a swelling agent such as methanol or n-propanol, or the polymer may be dissolved in an alkaline medium at temperatures above 100° C. with subsequent reprecipitation. Suitable solvents are, for example, benzyl alcohol, diethylene glycol monoethyl ether or a mixture comprising 60 percent of methanol and 40 percent of water, as alkalies, ammonia and aliphatic amines.

The polymers may be stabilized against the action of heat, light and oxygen in the same manner as other trioxane copolymers. As heat stabilizers there are suited, for example, polyamides, amides of polybasic carboxylic acids, amidines and urea compounds, as oxidation stabilizers phenols, especially bis-phenols and aromatic amines while oxybenzophenone derivatives may be used as light stabilizers.

The copolymers cited are especially suitable for the manufacture of foam plastics utilized, inter alia, for covering cables. However, even after degradation of the unstable semi-formal terminal groups, shaped articles can be obtained according to the injection-molding or extrusion method.

The following examples serve to illustrate the invention but they are not intended to limit it thereto:

*Example 1*

98 grams of liquid, freshly distilled trioxane were placed in a glass with screw cap and 2 grams of cyclohexene-1,2-oxide-4,4-dioxymethylene-acrolein acetal added thereto. After 0.1 cc. of boronfluoride-diethyl-etherate had been added by means of a syringe, the glass was closed and placed in a water bath having a temperature of 70° C. After about 20 minutes, the turbidity of the mixture showed that polymerization had set in. The glass was left in the water bath for 60 minutes before it was broken. The comminuted polymer was boiled with methanol which contained 1 percent of triethanol amine. After the product had been hydrolyzed homogeneously in diethylene glycol monoethyl ether in the presence of 1 percent of amine for one hour at 150° C. with subsequent boiling of the diethylene glycol monoethyl ether with methanol, a white powder was obtained. The yield amounted to 56 percent, calculated on the trioxane used. The polymer had a viscosity of $\eta_{red}$ 1.51 (measured in a solution of 0.5% strength by weight in butyrolactone containing 2% of diphenylamine as a stabilizer, at 140° C.).

*Example 2*

100 parts by weight of liquid trioxane were mixed with 10 parts of cyclohexene-1,2,-oxide-4,4-dioxymethylene-acrolein acetal and 0.4 part of borontrifluoride-etherate and introduced into a reaction vessel of refined steel which was placed in a thermostat having a temperature of 70° C. After about one hour the block was polymerized throughout. The product was worked up in the manner as described in Example 1.

*Example 3*

0.2 gram of para-nitrophenyl-diazonium-fluoborate was placed in a reaction vessel that had been preheated and scavenged with nitrogen. 2 cc. of cyclohexene-1,2-oxide-4,4-dioxymethylene formal were added thereto from a burette and 100 cc. of freshly distilled trioxane were added from a graduated distilling receiver. The reaction vessel was placed in a thermostat having a temperature of 70° C. After about one hour the reaction vessel was quenched in cold water, whereupon the block polymer could easily be detached from the vessel. The polymer was worked up in the usual manner.

The ground polymer constitutes a very finely divided white powder which can be processed into a foam plastic on a platen-press within 5 minutes at 200° C. under a pressure of about 50 kg./cm.$^2$. The foam plastic had a specific gravity of 0.3 g./cc.

We claim:
1. A process for the manufacture of three-dimensionally cross-linked copolymers, which comprises polymerizing, within a temperature range of from —50° C. to +100° C. and in admixture with a cationically active catalyst, 99.9 to 80 percent by weight, calculated on the total monomer mixture, of trioxane and 0.1 to 20 percent by weight, calculated on the total monomer mixture, of a bifunctional dimethylol acetal of a member selected from the group consisting of a saturated aldehyde containing 1 to 4 carbon atoms, an olefinically unsaturated aldehyde and a halogen-substituted saturated aldehyde containing 1 to 4 carbon atoms, the methylol groups of said bifunctional dimethylol acetal being substituted by an epoxide group-containing radical, selected from the group consisting of an aliphatic hydrocarbon radical containing 2 to 8 carbon atoms and a cycloaliphatic hydrocarbon radical containing 5 to 8 carbon atoms.

2. A process as claimed in claim 1, wherein 99.9 to 95 percent by weight, calculated on the total monomer mixture, of trioxane and 0.1 to 5 percent by weight, calculated on the total monomer mixture of said bifunctional dimethylol acetal, are copolymerized.

3. A process as claimed in claim 1, wherein said bifunctional dimethylol acetal is a member selected from the group consisting of cyclohexene-1,2-oxide - 4,4 - dioxymethylene formal, cyclohexene-1,2-oxide-4,4-dioxymethylene-acrolein acetal and 1,1-dimethylol-propene-oxide-2,3-monochloracetaldehyde acetal.

4. The process of claim 1, wherein the polymerization is carried out within a temperature range of from +60° C. to +80° C.

5. The process of claim 1, wherein 0.0001 to 1 percent by weight, calculated on the total monomer mixture of a cationically active catalyst, is used.

6. The process of claim 1, wherein the polymerization is carried out in the presence of an organic solvent.

7. The process of claim 1, wherein said cationically active catalyst is selected from the group consisting of boron fluoride, an etherate thereof, and a diazonium-fluoborate.

8. A three-dimensionally cross-linked copolymer prepared from trioxane and a bifunctional dimethylol acetal by the process of claim 1.

9. A copolymer as in claim 8 wherein said bifunctional dimethylol acetal is a member selected from the group consisting of cyclohexene-1,2-oxide-4,4 - dioxymethylene formal; cyclohexene-1,2-oxide-4,4-dioxymethylene - acrolein acetal; and 1,1-dimethylol-propene-oxide-2,3-monochlor-acetaldehyde acetal.

References Cited by the Examiner
UNITED STATES PATENTS

| | | | |
|---|---|---|---|
| 2,765,296 | 10/1956 | Strain | 260—85.7 |
| 3,210,318 | 10/1965 | Dolce et al. | 260—45.8 |
| 3,215,671 | 11/1965 | Melby | 260—67 |
| 3,219,725 | 11/1965 | Kirkland | 260—823 |

WILLIAM H. SHORT, *Primary Examiner.*

SAMUEL H. BLECH, L. M. MILLER,
*Assistant Examiners.*